(12) United States Patent
Lamb et al.

(10) Patent No.: US 6,181,324 B1
(45) Date of Patent: Jan. 30, 2001

(54) PORTABLE WEATHER DISPLAY DEVICE

(76) Inventors: Donald T. Lamb, 508 Hess Rd., Elizabethtown, PA (US) 17022; Gary L. Hoffer, 122 W. Market St., Marietta, PA (US) 17547

(*) Notice: Under 35 U.S.C. 154(b), the term of this patent shall be extended for 0 days.

(21) Appl. No.: 09/124,253

(22) Filed: Jul. 29, 1998

(51) Int. Cl.[7] ............................. G09G 5/00; G06F 19/00
(52) U.S. Cl. ........................... 345/156; 345/169; 702/3
(58) Field of Search .................................. 345/156, 169, 345/905, 961; 702/3, 4; 455/11.1, 556, 557, 568; 364/708

(56) References Cited

U.S. PATENT DOCUMENTS

| | | | |
|---|---|---|---|
| 4,348,693 | 9/1982 | Cauldwell | 358/140 |
| 4,443,801 | 4/1984 | Klose et al. | 343/442 |
| 4,521,857 | 6/1985 | Reynolds, III | 364/439 |
| 5,023,824 | * 6/1991 | Chadima, Jr. et al. | 364/708 |
| 5,265,024 | 11/1993 | Crabill et al. | 364/443 |
| 5,379,215 | 1/1995 | Kruhoeffer et al. | 364/420 |
| 5,410,314 | 4/1995 | Frush et al. | 342/26 |
| 5,471,211 | 11/1995 | Randall et al. | 342/26 |
| 5,583,972 | 12/1996 | Miller | 395/119 |
| 5,589,833 | 12/1996 | Randall et al. | |
| 5,717,589 | 2/1998 | Thompson et al. | 364/420 |
| 5,867,805 | * 2/1999 | Brown | 702/3 |
| 5,956,625 | * 9/1999 | Hansen et al. | 455/90 |
| 5,978,738 | * 9/2000 | Brown | 702/3 |
| 5,978,922 | * 11/1999 | Arai et al. | 713/323 |
| 5,983,073 | * 11/1999 | Ditzik | 455/11.1 |
| 6,119,155 | * 9/2000 | Rossmann et al. | 709/219 |

FOREIGN PATENT DOCUMENTS 2178872  2/1987  (GB).

* cited by examiner

*Primary Examiner*—Amare Mengistu
*Assistant Examiner*—Jimmy H Nguyen
(74) *Attorney, Agent, or Firm*—Richard C. Litman

(57) ABSTRACT

A portable weather display device including an upper and a lower hollow housing connected together by a hinge containing a power on/off switch. In the upper housing there is a backlit approximately 6" diagonal SVGA color touch-sensitive display and a warning speaker to signal NOAA weather alerts. The upper housing also includes a rubber gasket which seals out dust and water when closed. In the lower housing there is a central processing unit (CPU), 32 megabytes of RAM, 64 megabytes of Flash ROM, a display driver, a communications interface or device, an NiMH battery (and an external AC power adapter), a standard RJ11 phone jack, a plastic sliding protector to cover over these ports, a cellular antenna, a locking clasp to keep the device closed tightly, and battery and power indicator lights. Software embedded in the portable weather display device includes a custom-built operating system and application programs to perform receive, read, and display functions of the weather information coming into and stored on the portable weather display device.

16 Claims, 4 Drawing Sheets

PORTABLE WEATHER DISPLAY DEVICE

BACKGROUND OF THE INVENTION

1. Field of the Invention

The present invention relates generally to computerized weather information systems and, more particularly, to a hand-held, electronic read-only weather device.

2. Description of the Related Art

One source of detailed weather information is the National Weather Service (NWS), operated by the National Oceanic and Atmospheric Administration (NOAA), United States Department of Commerce. NWS operates approximately 380 weather observing stations which broadcast local weather data collected at locations scattered throughout the United States and its territories. The present invention, of course, may be employed with any other source or sources of comparably detailed and continuously updated weather information such as may be provided on a regional basis by other cooperating weather observing and forecasting organizations.

Such comprehensive weather information is extremely useful to those persons whose activities, safety or enjoyment depend in some way on real time comprehensive knowledge of local weather conditions. For example, mariners—both commercial and operators of pleasure craft—have a compelling need for reliable weather information in order to help plan for their trips, and to make them safer and more enjoyable. Those with outdoor professions, such as professional photographers, whose ability to attain proper lighting and visibility conditions is essential to complete their assignments, also depend heavily on accurate knowledge for weather conditions in remote locales.

The related art is represented by the following patents of interest.

U.S. Pat. No. 4,348,693, issued on Sep. 7, 1982 to Jack D. Cauldwell, describes a television weather radar system. Cauldwell does not suggest a portable weather display device according to the claimed invention.

U.S. Pat. No. 4,443,801, issued on Apr. 17, 1984 to Dirk R. Klose et al., describes a direction finding and frequency identification method and apparatus. Klose et al. do not suggest a portable weather display device according to the claimed invention.

U.S. Pat. No. 4,521,857, issued on Jun. 4, 1985 to Collins J. Reynolds, III, describes an aviation weather information dissemination system. Reynolds, III does not suggest a portable weather display device according to the claimed invention.

U.S. Pat. No. 5,265,024, issued on Nov. 23, 1993 to Norman L. Crabill et al., describes a pilots automated weather support system. Crabill et al. do not suggest a portable weather display device according to the claimed invention.

U.S. Pat. No. 5,379,215, issued on Jan. 3, 1995 to Douglas P. Kruhoeffer et al., describes a method for creating a 3-D image of terrain and associated weather. Kruhoeffer et al. do not suggest a portable weather display device according to the claimed invention.

U.S. Pat. No. 5,410,314, issued on Apr. 25, 1995 to Charles L. Frush et al., describes a bistatic multiple-doppler radar network. Frush et al. do not suggest a portable weather display device according to the claimed invention.

U.S. Pat. No. 5,471,211, issued on Nov. 28, 1995 to Mitchell A. Randall et al., describes a receiver antenna for a bistatic doppler radar network. Randall et al. do not suggest a portable weather display device according to the claimed invention.

U.S. Pat. No. 5,583,972, issued on Dec. 10, 1996 to Richard L. Miller, describes a 3-D weather display and weathercast system. Miller does not suggest a portable weather display device according to the claimed invention.

U.S. Pat. No. 5,589,833, issued on Dec. 31, 1996 to Mitchell A. Randall et al., describes a radar acquisition system. Randall et al. do not suggest a portable weather display device according to the claimed invention.

U.S. Pat. No. 5,717,589, issued on Feb. 10, 1998 to Thomas S. Thompson et al., describes a system and method providing for real-time weather tracking and storm movement prediction. Thompson et al. do not suggest a portable weather display device according to the claimed invention.

Great Britain Patent document 2,178,872, published on Feb. 18, 1987, describes a method of drilling a well using a predictive simulation. The Great Britain '872 document does not suggest a portable weather display device according to the claimed invention.

None of the above inventions and patents, taken either singularly or in combination, is seen to describe the instant invention as claimed.

SUMMARY OF THE INVENTION

The present invention is a portable weather display device which substitutes current satellite-fed desktop weather stations, and/or desktop or laptop computer weather stations which display real-time weather information, with a rugged, indoor/outdoor, hand-held, electronic read-only device. The portable weather display device comprises an upper and a lower hollow housing connected together by a hinge activating and containing a power on/off switch. The upper and lower housings are made of rugged, durable, shockproof, waterproof plastic.

The upper housing contains therein a backlit approximately 6" diagonal SVGA color touch-sensitive display and a warning speaker to signal NOAA weather alerts. The upper housing also includes a rubber gasket which seals out dust and water when closed. The lower housing contains therein a central processing unit (CPU), 32 megabytes of random access memory (RAM), 64 megabytes of Flash read only memory (ROM), a display driver, a communications interface or device, an NiMH battery (and an external AC power adapter), a standard RJ11 phone jack, a plastic sliding protector to cover over these ports, an antenna, a locking clasp to keep the device closed tightly, and battery and power indicator lights. The Flash ROM is in the form of updatable read only memory such as solid state EEPROMS or the like, or a compact high density hard drive. The communications interface or device may be an on-board cellular capable modem, softmodem, chip modem, wireless modem, or a PCMCIA slot for a PCMCIA modem.

Software embedded in the portable weather display device includes a custom-built operating system and application programs to perform receive, read, and display functions of the weather information coming into and stored on the device. A software communications program is provided to interface with a remote server which provides weather information, via cellular and standard modem, and to download the radar loops, satellite images and all types of weather information. The portable weather display device is preferably a read-only device. Although voice quality telephone transmission is the preferred means for communicating weather data from a remote weather server to the portable weather display device, other means can be employed including cellular, short wave, wireless, radio frequency, etc.

When opened the portable weather display device automatically turns on and dials out to a weather provider to begin receiving and displaying weather information on the backlit touch sensitive screen via a cellular wireless and standard RJ11 phone line modem. Icons on the touch-sensitive display allow the user to choose the type of weather information they want displayed and how it is displayed. Closing the portable weather display device automatically shuts it down.

The software program includes a main menu from which one of a plurality of options may be selected. The options are indicated on the main menu by icons at the top of the display. The first option is 'Register'. If this option is selected the user is able to register his/her serial number, to select a local dial-in site, to select a region, and to exit. The second option is 'Setup Options'. If this option is selected the user is able to change display detail, to select a standby mode, to change the brightness, to select auto/manual dial, to select defaults, and to exit. The third option is 'Weather Data'. If this option is selected the user is able to select radar images, to select lightening detection, to select tides, to select storm track, to select satellite images, to select short-term forecast, to select long-term forecast, to select precipitation totals, and to exit. The fourth option is 'Time'. If this option is selected the user is able to observe the time of day. The fifth option is 'NOAA Alerts'. If this option is selected the user is able to observe any NOAA alerts. The sixth option is 'Print'. If this option is selected the user is able to print out data. The seventh option is 'Battery'. If this option is selected the user is able to observe the status of the power supply. The eighth option is 'Exit'. If this option is selected the user is able to exit the program.

Accordingly, it is a principal object of the invention to provide a portable weather display device which displays real-time weather information.

It is another object of the invention to provide a portable weather display device which does not receive data input from the user in any function.

It is an object of the invention to provide improved elements and arrangements thereof in a portable weather display device for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
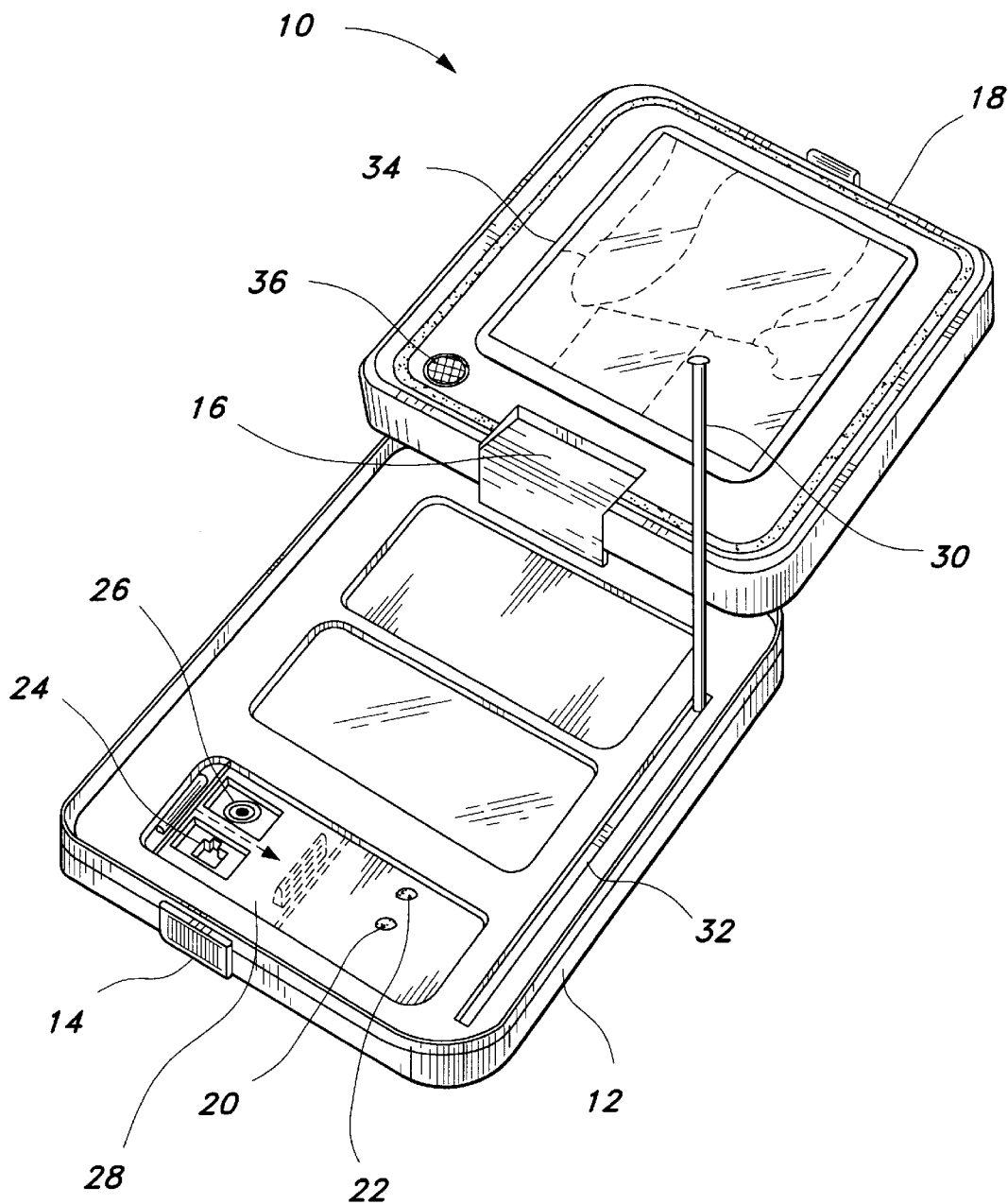
FIG. 1 is a top, perspective view of a portable weather display device according to the present invention.

The present invention is a portable weather display device 10 which substitutes current satellite-fed desktop weather stations, and/or desktop or laptop computer weather stations which display real-time weather information, with a rugged, indoor/outdoor, hand-held, electronic read-only device. The portable weather display device 10 comprises an upper and a lower hollow housing 12 connected together by a hinge 16 containing a power on/off switch 110. The upper and lower housings are made of rugged, durable, shockproof, waterproof plastic.

The upper housing contains therein a backlit approximately 6" diagonal SVGA color touch-sensitive display 34 and a warning speaker 36 to signal NOAA weather alerts. The upper housing also includes a rubber gasket 18 which seals out dust and water when closed. The lower housing contains therein a CPU 100, 32 megabytes of RAM 118, 64 megabytes of Flash ROM 120, a display driver, a communications interface or device 116, an NiMH battery 100 (and an external AC power adapter), a standard RJ11 telephone jack 24, battery and power indicator lights 20,22, a plastic sliding protector 28 to cover over the telephone jack 24 and the indicator lights 20,22, an antenna 30, a locking clasp 14 to keep the device closed tightly. The Flash ROM is in the form of updatable read only memory such as solid state EEPROMS or the like, or a compact high density hard drive. The communications interface or device may be an on-board cellular capable modem, softmodem, chip modem, wireless modem, or a PCMCIA slot for a PCMCIA modem.

Software embedded in the portable weather display device includes a custom-built operating system and application programs to perform receive, read, and display functions of the weather information coming into and stored on the portable weather display device 10. A software communications program is provided to interface with a remote server which provides weather information, via cellular and standard modem to download the radar loops, satellite images and all types of weather information. The portable weather display device 10 is preferably a read-only device. Although voice quality telephone transmission is the preferred means for communicating weather data from a remote weather server to the portable weather display device 10, other means can be employed including cellular, short wave, wireless, radio frequency, etc.

When opened the portable weather display device 10 automatically turns on and dials out to a weather provider to begin receiving and displaying weather information on the backlit touch sensitive screen 34 via a cellular wireless and standard RJ11 phone line modem. Icons on the touch-sensitive display allow the user to choose the type of weather information they want displayed and how it is displayed. Closing the portable weather display device 10 automatically shuts it down.

Figure 2A:
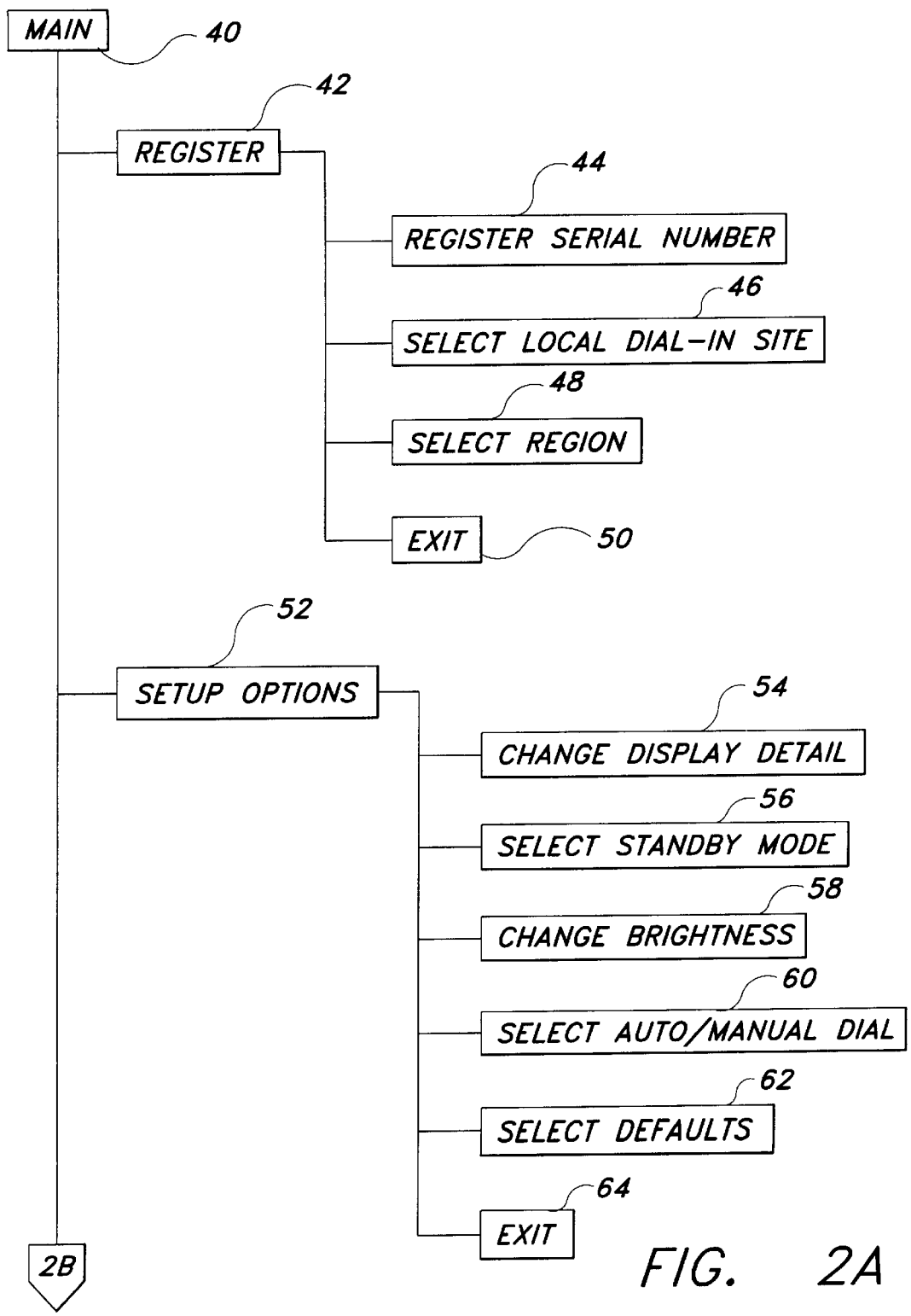
FIGS. 2A and 2B together form a flow chart of the software included in the present invention.
Figure 2B:
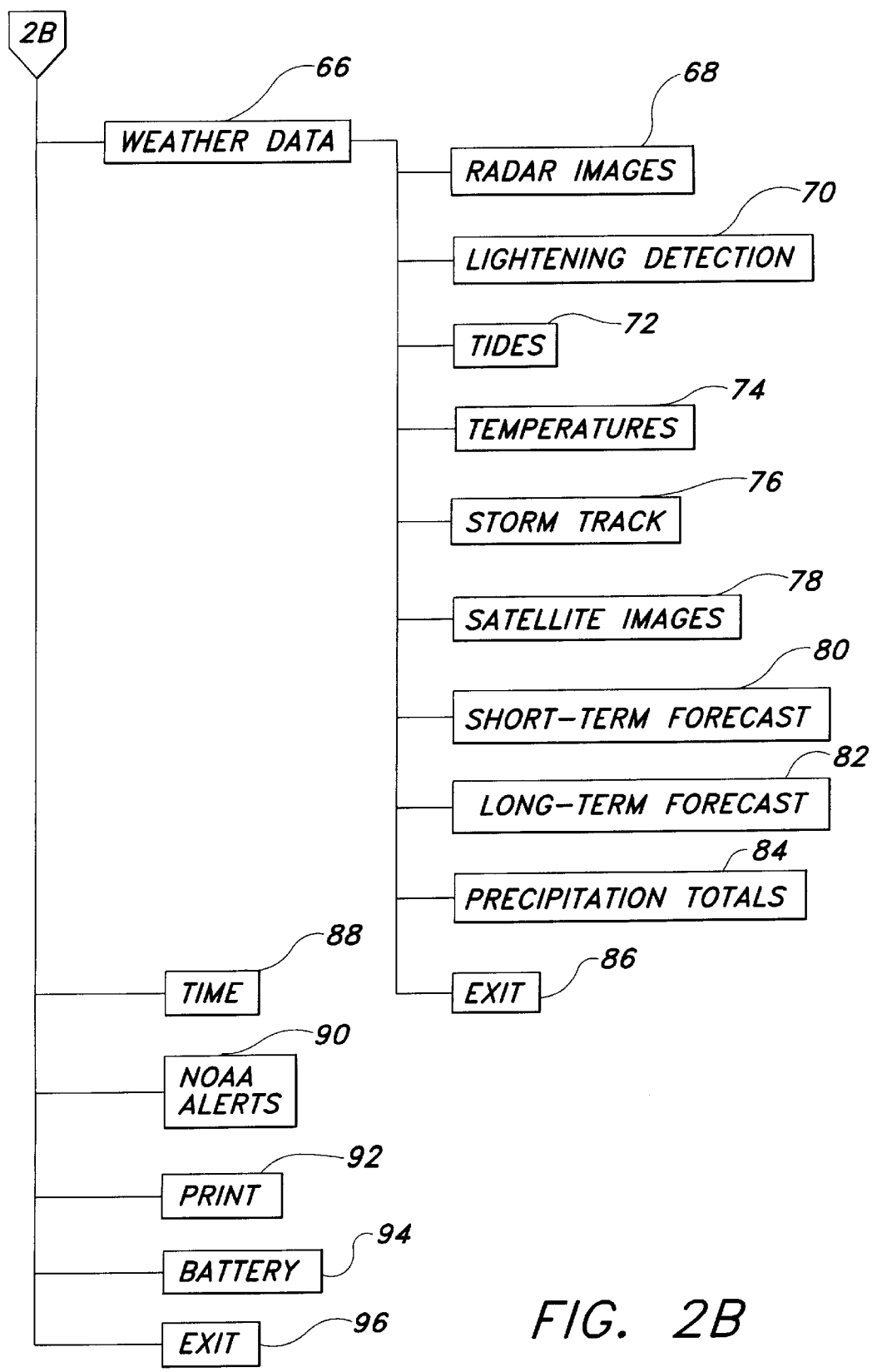
Figure 3:
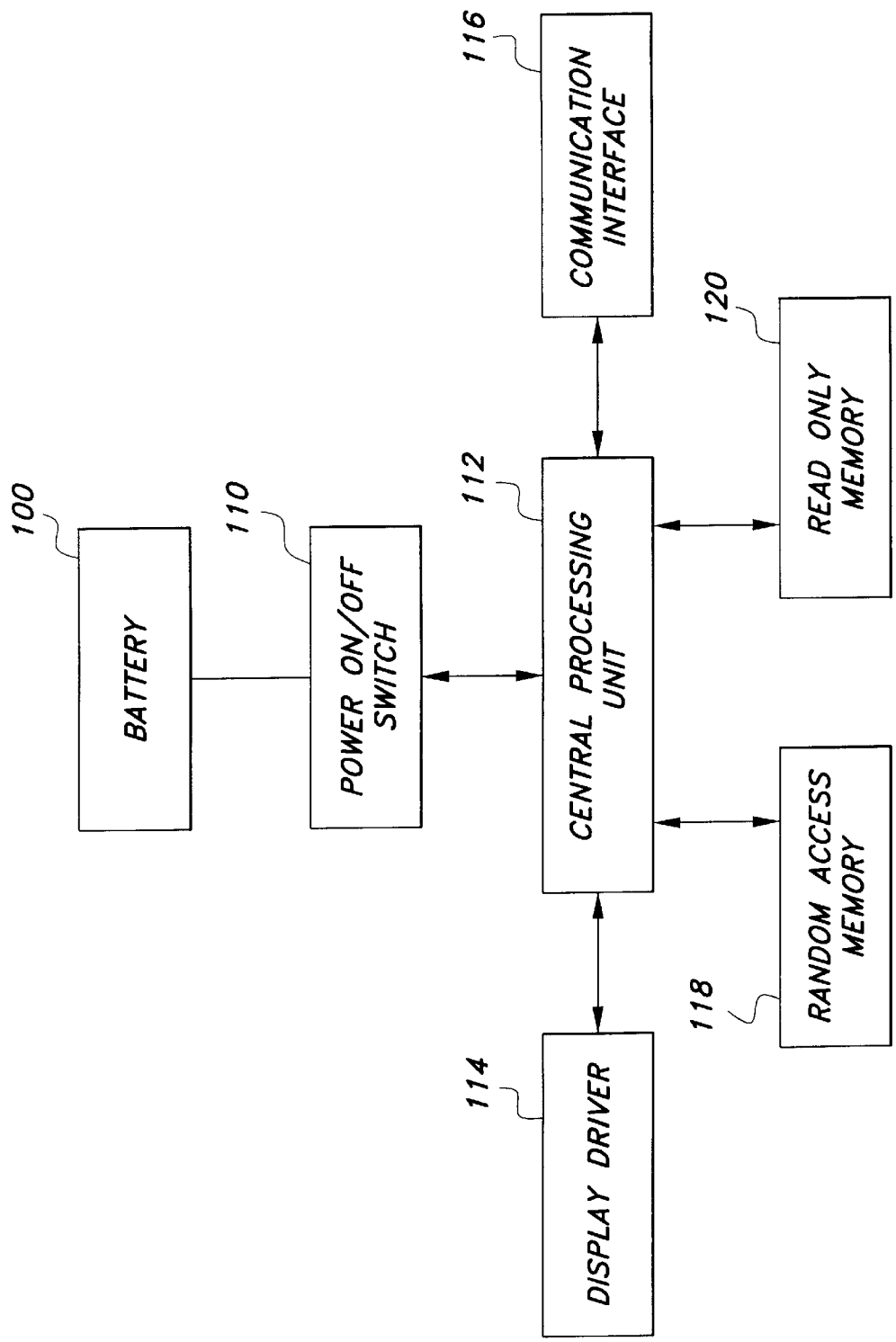
FIG. 3 is a block diagram of a portable weather display device according to the invention.

A flow chart of the software program contained within the weather device 10 is shown in FIGS. 2A and 2B. The software program includes a main menu 40 from which one of a plurality of options may be selected. The options are indicated on the main menu by icons at the top of the display 34.

The first option is 'Register' 42. If this option is selected the user is able to register his/her serial number 44, to select a local dial-in site 46, to select a region 48, and to exit 50.

The second option is 'Setup Options' 52. If this option is selected the user is able to change display detail 54, to select a standby mode 56, change the brightness 58, to select auto/manual dial 60, to select defaults 62, and to exit 64.

The third option is 'Weather Data' 66. If this option is selected the user is able to select radar images 68, to select lightening detection 70, to select tides 72, to select storm track 76, to select satellite images 78, to select short-term forecast 80, to select long-term forecast 82, to select precipitation totals 84, and to exit 86.

The fourth option is 'Time' 88. If this option is selected the user is able to observe the time of day.

The fifth option is 'NOAA Alerts' 90. If this option is selected the user is able to observe any NOAA alerts.

The sixth option is 'Print' 92. If this option is selected the user is able to print out data.

The seventh option is 'Battery' 94. If this option is selected the user is able to observe the status of the power supply.

The eighth option is 'Exit' 96. If this option is selected the user is able to exit the program.

It should be understood that one skilled in the art of engineering software would be able to encode each of the above described options to operate in a manner consistent with the purposes and hardware features described herein. Nevertheless, the combination of components and software described herein is not known to the prior art; therefore, it is to be understood that the present invention is not limited to the sole embodiment described above, but encompasses any and all embodiments within the scope of the following claims.

We claim:

1. A portable weather display device comprising:

an upper hollow housing containing a backlit color touch-sensitive display, a warning speaker to signal weather alerts, and a rubber gasket which seals out dust and water when closed;

a lower hollow housing containing a central processing unit, a random access memory, a read only memory, a display driver, a communications interface or device, a battery, a telephone jack, battery and power indicator lights, a plastic sliding protector to cover the telephone jack and indicator lights, an antenna, and a locking clasp to keep the device closed tightly; and a hinge containing a power on/off switch and connecting the upper hollow housing to the lower housing;

wherein the portable weather display device automatically turns on and dials out to a weather provider when opened to begin receiving and displaying weather information on the backlit touch sensitive screen via a modem.

2. The portable weather display device according to claim 1, wherein the read only memory is a Flash read only memory in the form of updatable read only memory.

3. The portable weather display device according to claim 2, wherein the Flash read only memory comprises solid state EEPROMS.

4. The portable weather display device according to claim 1, wherein the read only memory is a compact high density hard drive.

5. The portable weather display device according to claim 1, wherein the communications interface or device is selected from the group consisting of an on-board cellular capable modem, a softmodem, a chip modem, a wireless modem, and a PCMCIA modem.

6. The portable weather display device according to claim 1, further comprising software embedded in the portable weather display device that includes a custom-built operating system and application programs to perform receive, read, and display functions of weather information coming into and stored on the portable weather display device.

7. The portable weather display device according to claim 1, wherein the portable weather display device automatically shuts down when the portable weather display device is closed.

8. The portable weather display device according to claim 1, wherein the software embedded in the portable weather display device includes a main menu from which options may be selected including 'Register' to enable a user to register a serial number, to select a local dial-in site, to select a region, and to exit, 'Setup Options' to enable a user to change display detail, to select a standby mode, to change the brightness, to select auto/manual dial, to select defaults, and to exit, 'Weather Data' to enable a user to select radar images, to select lightening detection, to select tides, to select storm track, to select satellite images, to select short-term forecast, to select long-term forecast, to select precipitation totals, and to exit, 'Time' to enable a user to observe the time of day, 'NOAA Alerts' to enable a user to observe any National Oceanic Atmospheric Administration alerts, 'Print' to enable a user to print out data, 'Battery' to enable a user to observe the status of the power supply, and 'Exit' to enable a user to exit.

9. A portable display device comprising:

an upper hollow housing containing a backlit color touch-sensitive display, a warning speaker to signal weather alerts, and sealing means for sealing out dust and water when said display device is closed;

a lower hollow housing containing a central processing unit, a random access memory, a read only memory, a display driver, a communications interface or device, a battery, a telephone jack, battery and power indicator lights, a plastic sliding protector to cover the telephone jack and indicator lights, an antenna, and a locking clasp to keep the device closed tightly; and a hinge containing a power on/off switch and connecting the upper hollow housing to the lower housing;

wherein the portable display device automatically turns on and dials out to a service provider when opened to begin receiving and displaying weather information on the backlit touch sensitive screen via a modem.

10. The portable display device according to claim 9, wherein the read only memory is a Flash read only memory in the form of updatable read only memory.

11. The portable display device according to claim 10, wherein the Flash read only memory comprises solid state EEPROMS.

12. The portable display device according to claim 9, wherein the read only memory is a compact high density hard drive.

13. The portable display device according to claim 9, wherein the communications interface or device is selected from the group consisting of an on-board cellular capable modem, a softmodem, a chip modem, a wireless modem, and a PCMCIA modem.

14. The portable display device according to claim 9, further comprising software embedded in the portable weather display device that includes a custom-built operating system and application programs to perform receive, read, and display functions of weather information coming into and stored on the portable display device.

15. The portable display device according to claim 9, wherein the portable display device automatically shuts down when the portable display device is closed.

16. The portable display device according to claim 9, wherein the software embedded in the portable display device includes a main menu from which options may be selected including 'Register' to enable a user to register a serial number, to select a local dial-in site, to select a region, and to exit, 'Setup Options' to enable a user to change display detail, to select a standby mode, to change the brightness, to select auto/manual dial, to select defaults, and to exit, 'Weather Data' to enable a user to select radar images, to select lightening detection, to select tides, to select storm track, to select satellite images, to select short-term forecast, to select long-term forecast, to select precipitation totals, and to exit, 'Time' to enable a user to observe the time of day, 'NOAA Alerts' to enable a user to observe any National Oceanic Atmospheric Administration alerts, 'Print' to enable a user to print out data, 'Battery' to enable a user to observe the status of the power supply, and 'Exit' to enable a user to exit.

* * * * *